July 5, 1966 S. W. LIDDLE 3,259,331

BRAKE MEMBER FOR A TAPE CARTRIDGE

Filed Aug. 1, 1963

INVENTOR.
STEPHEN W. LIDDLE
BY Martin Lukacher
Attorney 3,259,331
BRAKE MEMBER FOR A TAPE CARTRIDGE
Stephen W. Liddle, Indianapolis, Ind., assignor to Radio Corporation of America, a corporation of Delaware
Filed Aug. 1, 1963, Ser. No. 299,409
2 Claims. (Cl. 242—55.13)

The present invention relates to apparatus for handling tape and other reelable mediums, and particularly to a cartridge for carrying a reelable medium, such as a magnetic tape record.

The present invention is especially suitable for use in a cartridge of the type described in United States Patent No. 3,027,110, issued March 27, 1962, to Dallas R. Andrews, and United States Patent No. 3,027,111, also issued March 27, 1962, to George E. Redfield. Features of the invention may be generally useful in cartridges other than of the type described in the aforementioned patents. For example, the invention may be applicable to cartridges having a single spool around which an endless tape is wound and wherein the tape is reeled between the innermost and outermost turns on the spool.

In a tape cartridge of the type described in the aforementioned patents, a brake plate is slidably mounted between a flexible sheet or liner and a cartridge wall. The liner separates the tape from the cartridge wall, facilitating tape reeling. The liner interferes with the reeling of the tape under some conditions of operation.

Accordingly, it is an object of the present invention to provide an improved cartridge for carrying magnetic tape or other reelable mediums wherein interference between the tape and other elements is overcome.

It is a further object of the present invention to provide an improved tape cartridge having a brake plate which is separated from the tape by means of a liner loosely disposed over the plate, and wherein the tendency, under adverse conditions of operation, of the liner to interfere with the motion of the tape is overcome.

It has been found that a member, such as a brake plate, which is slidably mounted between a flexible liner and the surface of the cartridge wall, may adhere to the flexible liner under some conditions. For example, the brake plate may adhere to the liner when the liner becomes electrostatically charged or when dirt and moisture enter the cartridge, as when the cartridge is opened and resealed without due care.

A cartridge embodying the invention includes a slidably mounted member disposed between the surface of the cartridge wall and a flexible liner. The slidable member is formed with an array of protrusions, such as dimples or other embossings, which project toward the liner. The surface of the slidable member which faces the liner may also be grooved. The protrusions and grooves prevent adherence of the liner to the member, or vice-versa. Accordingly, any tendency for the liner to curl or ripple when the member is moved is eliminated, and interference with the reeling of the tape, as might be caused by the liner, is overcome.

The invention itself, both as to its organization and method of operation, as well as additional objects and advantages thereof, will become more readily apparent from a reading of the following description in connection with the accompanying drawing, in which.

Figure 1:
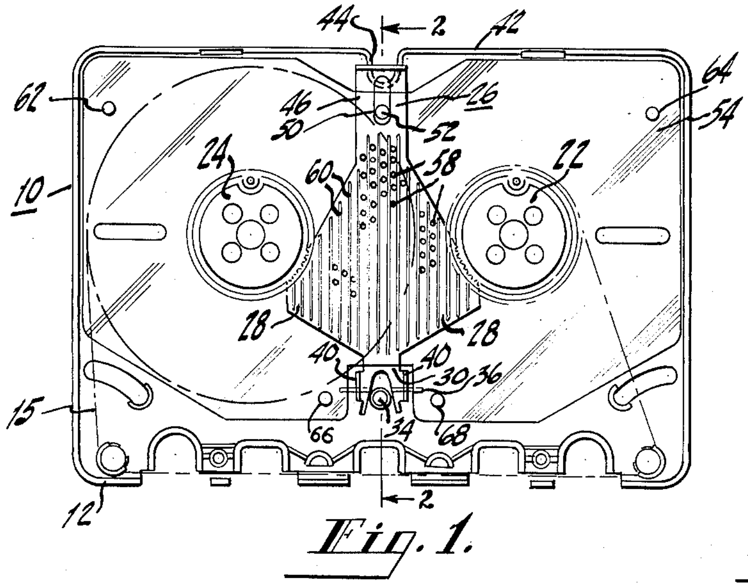
FIG. 1 is a plan view of a tape cartridge embodying the invention, one-half of the cartridge casing being removed to expose the hubs, liner and brake plate.
Figure 2:
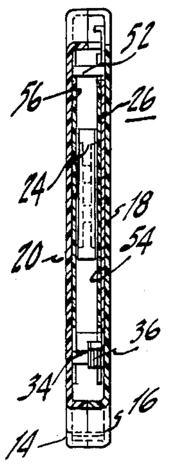
FIG. 2 is a sectional view of the cartridge shown in FIG. 1, taken along the line 2—2 in FIG. 1, when viewed in the direction of the arrows.

Referring more particularly to the drawings, there is shown a magnetic tape cartridge 10 similar to the tape cartridge shown in United States Patent No. 3,027,110 and United States Patent No. 3,027,111, which were mentioned above. These patents describe the cartridge and its utility in a magnetic recording and reproducing machine. Accordingly, only the differences between the present arrangement and the prior machine are described in detail herein.

The cartridge 10 includes a casing 12 having two parts 14 and 16 referred to, for the sake of convenience, as the upper part 14 and the lower part 16, respectively. The lower part 16 has a bottom wall 18, and the upper part 14 has a top wall 20. These walls have openings in which a pair of spools or hubs 22 and 24 are received. A magnetic tape 15 is wound around these hubs and can be reeled therebetween as explained in the above-cited patents by the reeling and driving mechanisms of the recording and reproducing machine.

A member 26 in the form of a thin plate of metal, such as aluminum, is mounted on the inner surface of the bottom wall 18. The member 26 functions as a brake plate and has wing portions 28 serrated along their edges which engage and brake the hubs 22 and 24. A recess (not shown) in the bottom wall 18 in which the plate 26 may be located may be provided. The forward end 30 of the plate 26 has a notch 32 which is adapted to receive a post 34 which projects from the bottom wall 18 of the cartridge. A coil spring 36 wound around this post 34 has laterally extending arms engaged in notches 38 in tabs 40 which extend upwardly from the forward end 30 of the plate 26. The spring 36 is wound in a manner to bias the plate 26 toward the rear wall 42 of the cartridge. In this position, as shown in FIG. 1, the serrated edges of the wing portions 28 engage the hubs 22 and 24 to brake them against turning.

Figure 3:
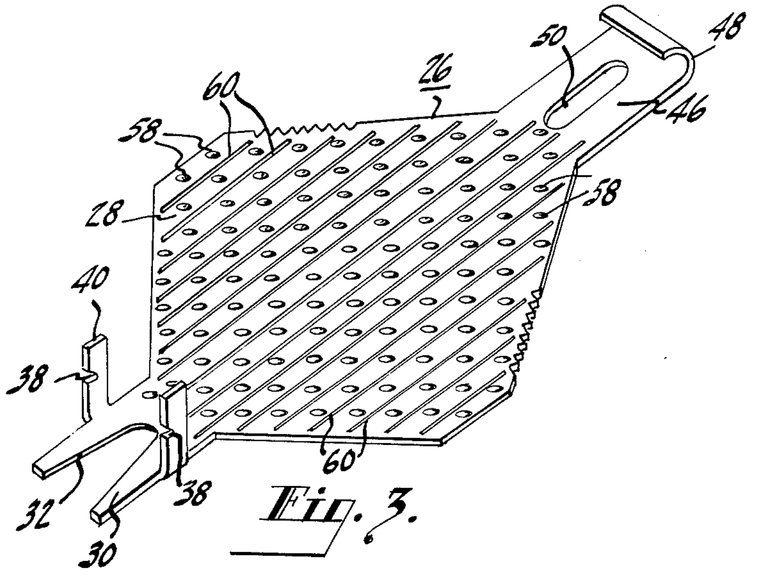
FIG. 3 is a perspective view of the brake plate shown in FIGS. 1 and 2.

A notch 44 is provided in the rear wall 42 of the cartridge, and the rear end 46 of the plate 26 extends through the rear wall 42 into this notch 44. The extreme end portion 48 of the rear end 46 of the plate 26 which extends into the notch 44 is bent upwardly and back along a curve, as best seen in FIG. 3. This bent portion 48 is adapted to be engaged by a pin external to the cartridge when the cartridge is inserted in a tape machine, as is explained in the above-cited patents. The pin advances the plate 26 forwardly to retract the serrated edges from the hubs 22 and 24 so that the hubs are released from the serrated edges of the wing portions 28 and the tape may be reeled in either direction from one hub to the other. The rear end 46 of the plate 26 has a slot 50 therein through which extends a post 52, which projects from the bottom wall 18. This post 52 guides the sliding movement of the plate 26 when the plate is engaged by the aforementioned external pin on the tape machine.

Liners 54 and 56 in the form of flexible sheets of plastic, such as "Mylar," overlie the major portion of the surface of the bottom wall 18 and of the upper wall 20, respectively. The liner 54 on the bottom wall 18 overlies the brake plate 26 and prevents interference between the tape 15 and the brake plate 26.

In order to prevent adherence of the liner sheet 54 to the brake plate 26, or vice-versa, an array of protrusions is provided on the upper surface of the brake plate 26. These protrusions are in the form of columns of dimple embossings 58. For example, one hundred ninety-seven dimpled embossings 58 are formed in the brake plate in the process of its construction. A die may be used to make these embossings, as when the plate is stamped from sheet stock. The embossings 58 cover that area of the cartridge over which the tape wound on the hubs 22 and 24 may extend. This area, generally, is that embraced by the wings 28 and the region therebetween and extends, roughly, from adjacent the notch 32 to adjacent the slot 50. The dimple embossings 58 provide voids therearound between the liner 54 and the greater area of the plate 26, thereby essentially separating the liner from the plate. This reduces the tendency of the liner 54 to adhere to the brake plate 26 due to the force of the tape against the liner 56. Thus, the tendency of the liner 54 to curl or form into ripples is minimized, if not wholly eliminated.

Grooves 60 may be formed, as by pressing in a die, between adjacent columns of dimple embossings 58. These grooves 60, like the dimple embossings 58, tend to break any bond which may form due to static electricity, dirt, or the like between the liner 56 and the surface of the plate 26. Any tendency for the liner 56 and the plate 26 to adhere to each other, which might cause the liner 56 to curl or ripple when the plate is advanced forwardly, is thereby overcome.

Four posts 62, 64, 66 and 68 project upwardly from the bottom wall 18 and closely approach the upper wall 20. Two of these posts, 62 and 64, are located near the rear wall of the cartridge. The remaining posts, 66 and 68, are located adjacent the post 34 on which the spring 36 is mounted and near the front edge of the liners 54 and 56. Holes are provided in the liners 54 and 56 through which these posts 62, 64, 66 and 68 extend. The posts hold the liners 54 and 56 in proper position and oppose any movements thereof which may be due to the snubbing action of the edges of the tape against the edges of the liners. Thus, the liners 54 and 56 are further prevented from curling or "rippling."

From the foregoing description, it will be apparent that there has been provided an improved cartridge especially suitable for carrying a magnetic tape. This cartridge includes the features of a slidable brake plate and liner sheets for protecting the walls of the cartridge and prevents any shifting, curling, or other undesired movement of the liner sheets. While one embodiment of the invention has been described herein, variations and modifications within the scope of the invention will very likely suggest themselves to those skilled in the art. Hence, the foregoing description should be taken as illustrative and not in any limiting sense.

What is claimed is:

1. In a magnetic tape record cartridge of the type having a casing with a pair of opposing walls and a spool mounted therein for rotation about an axis which is transverse to said opposing walls and including a roll of magnetic tape wound on said spool, the combination comprising:

a liner of thin flexible material disposed between an edge of said roll of magnetic tape and the adjacent wall of said casing to facilitate tape reeling, and a relatively flat brake member movably mounted in said casing between said liner and said adjacent wall and movable in a plane parallel to said liner between a first position engaging said spool to provide braking action to prevent rotation of said spool and a second position spaced from said spool to permit tape reeling, said liner undesirably tending to adhere to said brake member and to buckle in response to movement of said brake member from said first position to said second position thereby causing said liner to interfere with tape reeling, said brake member having means on a surface thereof facing said liner providing a plurality of voids between said liner and said brake member to minimize the area of contact between said brake member and said liner to thereby reduce the adherence between said liner and said brake member to prevent buckling of said liner in response to movement of said brake member from said first position to said second position.

2. In a magnetic tape record cartridge of the type having a casing with a pair of opposing walls and two spools mounted therein for rotation about spaced axes which are transverse to said opposing walls and including a roll of magnetic tape wound around said spools, the combination comprising:

a liner of thin flexible material disposed between an edge of said roll of magnetic tape and the adjacent wall of said casing to facilitate tape reeling, a planar generally V-shaped brake member movably mounted in said casing between said liner and said adjacent wall and extending between said spools, said brake member movable in a plane parallel to said liner and in a direction transverse to a line drawn between said axes between a first position engaging said two spools to provide braking action to prevent rotation of said spools and a second position spaced from said spools to permit tape reeling, said liner undesirably tending to adhere to said brake member and buckle in response to movement of said brake member from said first position to said second position thereby causing said liner to interfere with tape reeling, said brake member having an array of spaced protrusions on a surface thereof and projecting therefrom towards said liner to minimize the area of contact between said brake member and said liner to thereby reduce the adherence between said liner and said brake member to prevent buckling of said liner in response to movement of said brake member from said first position to said second position.

References Cited by the Examiner

UNITED STATES PATENTS

| | | | |
|---|---|---|---|
| 3,027,110 | 3/1962 | Andrews | 242—55.13 |
| 3,099,414 | 7/1963 | Kulka | 242—71.8 |

STANLEY N. GILREATH, *Primary Examiner.*

MERVIN STEIN, *Examiner.*

G. F. MAUTZ, *Assistant Examiner.*